United States Patent
Setiadi et al.

(10) Patent No.: US 8,786,977 B2
(45) Date of Patent: Jul. 22, 2014

(54) INDUCED TRANSDUCER HEAD VIBRATION

(75) Inventors: Dadi Setiadi, Edina, MN (US); Stefan A. Weissner, St. Louis Park, MN (US); David Gordon Qualey, Apple Valley, MN (US)

(73) Assignee: Seagate Technology LLC, Cupertino, CA (US)

( * ) Notice: Subject to any disclaimer, the term of this patent is extended or adjusted under 35 U.S.C. 154(b) by 223 days.

(21) Appl. No.: 13/274,186

(22) Filed: Oct. 14, 2011

(65) Prior Publication Data
US 2013/0094107 A1 Apr. 18, 2013

(51) Int. Cl.
*G11B 21/02* (2006.01)
(52) U.S. Cl.
USPC .................................................. 360/75
(58) Field of Classification Search
None
See application file for complete search history.

(56) References Cited

U.S. PATENT DOCUMENTS

| 7,193,806 | B1 | 3/2007 | Albrecht et al. | |
|---|---|---|---|---|
| 7,489,466 | B2 * | 2/2009 | Knigge et al. | 360/75 |
| 7,542,228 | B2 | 6/2009 | Knigge et al. | |
| 7,660,068 | B1 | 2/2010 | Baumgart et al. | |
| 2009/0059410 | A1 * | 3/2009 | Knigge et al. | 360/59 |

* cited by examiner

*Primary Examiner* — Paul Huber
(74) *Attorney, Agent, or Firm* — HolzerIPLaw, PC

(57) ABSTRACT

Vibration of a transducer slider can be used during slider fly height calibration to detect contact of the transducer slider with a disc surface. Amplification of the vibration may cause the transducer slider to tap the disc surface rather than drag across the disc surface when detecting contact with the disc surface. Amplification may be achieved by applying an in-phase AC signal to the transducer slider at the same frequency as the vibration of the slider. Reduced contact between the slider and the disc surface reduces wear on and the possibility of damage to the transducer slider and/or the disc surface. Once the fly height of the transducer slider is calibrated, the AC signal may be shifted out-of-phase with the slider vibration to dampen the slider vibration.

21 Claims, 6 Drawing Sheets

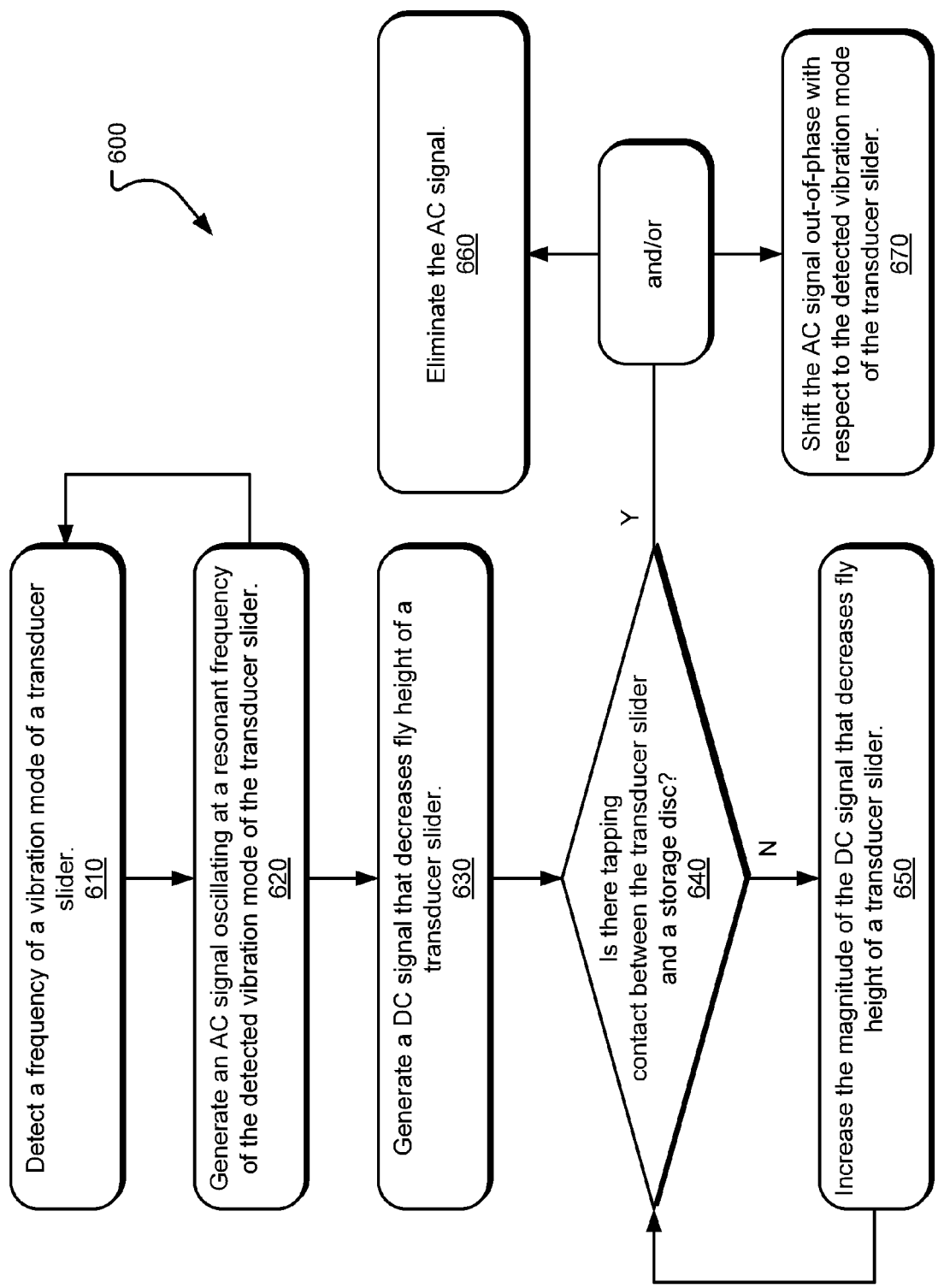

INDUCED TRANSDUCER HEAD VIBRATION

SUMMARY

Implementations described and claimed herein address the foregoing problems by providing a detection circuit comprising an actuator driver configured to generate an AC signal oscillating at a resonant frequency of a transducer slider to amplify a vibration mode of the transducer slider. Other implementations described and claimed herein provide a method comprising detecting a frequency of a vibration mode of a transducer slider, generating an AC signal oscillating at a resonant frequency of the detected vibration mode to amplify the detected vibration mode of the transducer slider, and detecting tapping contact between the transducer slider and a storage disc.

Still other implementations described and claimed herein provide an actuator driver circuit comprising a first branch with a non-inverting amplifier configured to output an AC signal oscillating at a resonant frequency of a transducer slider to amplify a detected vibration mode of the transducer slider, a second branch with an inverting amplifier configured to output an AC signal out-of-phase with the resonant frequency of the transducer slider to dampen the detected vibration mode of the transducer slider, and a switch configured to select the first branch prior to detecting tapping contact between the transducer slider and a storage disc and select the second branch after detecting the tapping contact.

Other implementations are also described and recited herein.

BRIEF DESCRIPTIONS OF THE DRAWINGS

FIG. 6 illustrates example operations for adjusting fly height of a transducer slider using tapping contact with a storage disc.

DETAILED DESCRIPTIONS

Spacing between transducer head sliders and associated storage media discs in storage media drives is often driven to very small magnitudes in an effort to accurately read and write data on the storage media discs with high areal recording density. In storage media drives where a slider flies in very close proximity to a disc surface, the slider may be subject to numerous forces (e.g., van der Waals interaction, disc lubricant meniscus capillary action, electrostatic forces, spindle motor charges, and contact electromotive force). Further, the forces exerted on slider the may have a variety of sources (e.g., molecular attraction of components in close proximity, buildup of electrical potential between the disc and the slider caused by the disc rotation (tribo-charging), buildup of electrical potential in spindle motor bearings, potential difference between different adjacent materials (i.e., Fermi level difference between disc material(s) and the slider material(s))).

One or more of the these forces and/or other forces on the slider create vibration of the slider. The vibration may be used during slider fly height calibration to avoid dragging the slider across the disc surface to detect contact of the slider with the disc surface. Amplification of the vibration can cause the slider to tap the disc surface, rather than drag across the disc surface when detecting contact with the disc surface. Reduced contact between the slider and the disc surface reduces wear on and the possibility of damage to the slider (e.g., burnishing of the slider) and/or the disc surface (e.g., carbon wear). Excessive wear can cause reliability problems in the storage media drive due to corrosion at the contact points and/or head amplitude degradation.

Figure 1:
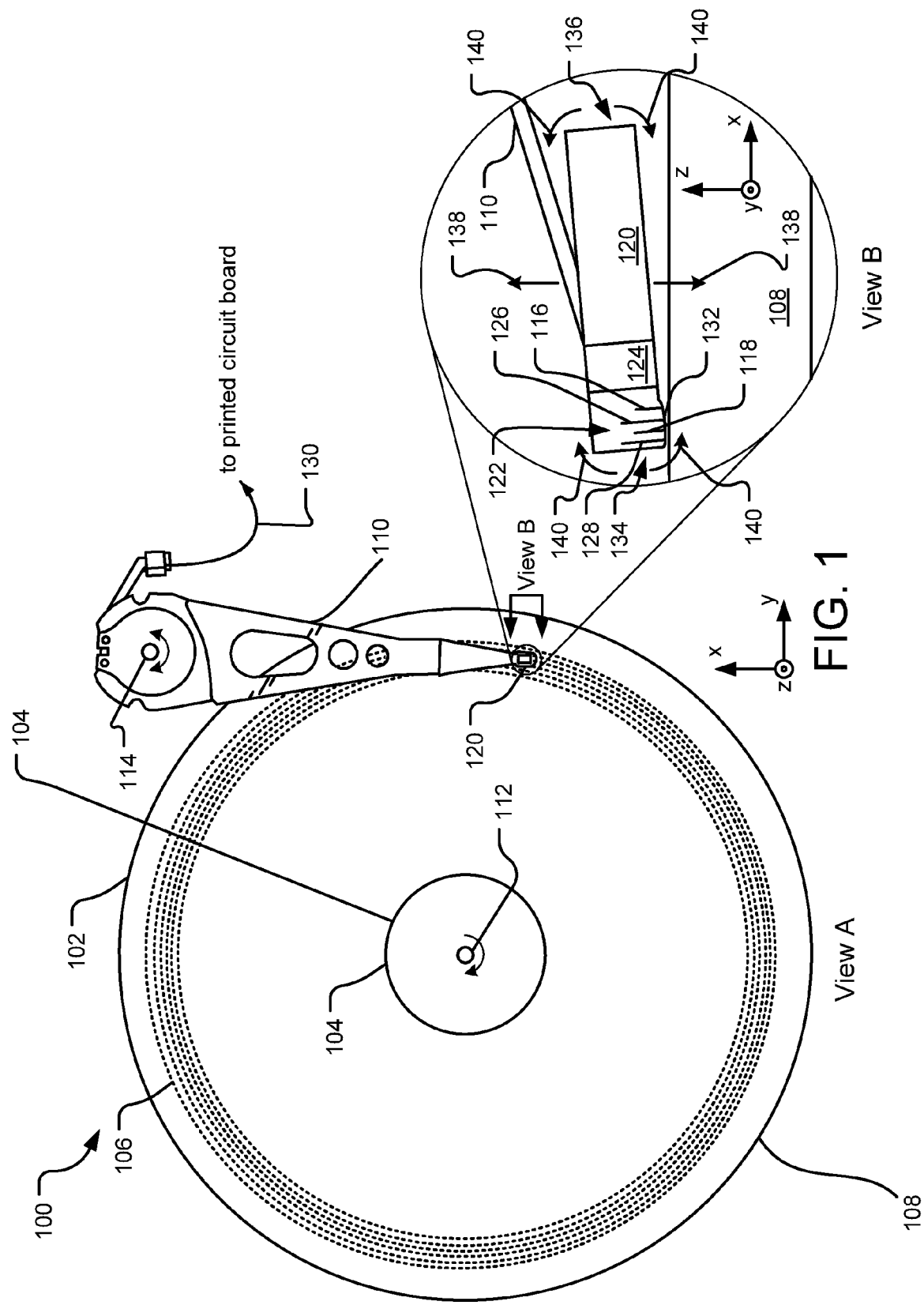
FIG. 1 illustrates a plan view of an example disc drive assembly including a transducer head on a distal end of an actuator arm positioned over a storage media disc.

FIG. 1 illustrates a plan view of an example disc drive assembly 100 including a slider 120 on a distal end of an actuator arm 110 positioned over a storage media disc 108. Referring specifically to View A, the disc 108 includes an outer diameter 102 and inner diameter 104 between which are a number of substantially circular data tracks 106 illustrated by circular dotted lines. In one implementation, the disc 108 rotates at a constant high speed about disc axis of rotation 112 as information is written to and read from the data tracks 106 on the disc 108. In another implementation, the disc 108 rotation speed is variable.

Information may be written to and read from the disc 108 through the use of the actuator arm 110. The actuator arm 110 rotates about an actuator axis of rotation 114 during a seek operation to located a desired data track on the disc 108. The actuator arm 110 extends toward the disc 108, and at the distal end of the actuator arm 110 is the slider 120, which flies in close proximity above the disc 108 while reading and writing data to the disc 108. In other implementations, there is more than one slider 120, actuator arm 110, and/or disc 108 in the disc drive assembly 100.

A flex cable 130 provides the requisite electrical connection paths for the slider 120 while allowing pivotal movement of the actuator arm 110 during operation. The flex cable 130 connects an off-head printed circuit board (PCB) (not shown) to the slider 120. The flex cable 130 may be routed along the actuator arm 110 from the PCB to the slider 120. The PCB typically includes circuitry for controlling the write currents applied to the slider 120 during a write operation and a preamplifier for amplifying read signals generated by the slider 120 during a read operation.

A side view of the slider 120 is shown in detail in View B of FIG. 1 and includes microelectronic components 122 mounted to a trailing edge 134 of the slider 120 with a basecoat 124 providing a physical interface between the microelectronic components 122 and the slider 120. The microelectronic components 122 include one or more of a reader 116, a fly height actuator 126, a writer 118, and a contact pad 128. Other microelectronic components may also be included in microelectronic components 122. The appearance of the microelectronic components 122 and other features of assembly 100 are for illustration purposes only and not drawn to scale.

The reader 116 reads data from the data tracks 106 on the disc 108. The writer 118 writes data to the data tracks 106 of the disc 108. The fly height actuator 126 varies the fly height of the reader 116 and writer 118 by expanding toward the disc 108 when power is applied to the fly height actuator 126.

Expansion of the fly height actuator 126 causes a protrusion 132 of the slider 120 toward the disc 108 near the fly height actuator 126. In one implementation, the fly height actuator 126 is thermally actuated. The contact pad 128 is the portion of the slider 120 that extends closest to the disc 108 and is configured to contact the disc 108 when the fly height actuator 126 creates a large enough protrusion 132. The protrusion 132 of FIG. 1 is illustrated close to but not contacting the disc 108.

The slider 120 is oriented at an angle with respect to the disc 108 so that the trailing edge 134 is closer to the disc 108 than a leading edge 136 of the slider 120. As discussed above, the slider 120 may vibrate during operation of the disc drive assembly 100. There may be several different modes of vibration of the slider 120. For example, the slider 120 may vibrate about any axis with a variety of modes.

For example, the slider 120 may vibrate about an axis at an end of the actuator arm 110 distal from the slider 120 and running in the y-direction as illustrated by arrows 138. This vibration causes generally up and down movement of the slider 120. In a further example, the slider 120 may vibrate about an axis running through the slider 120 from the leading edge 136 to the trailing edge 134 (not shown). This vibration causes a generally rocking motion of the slider 120 into and out of View B (not shown). Further yet, the slider 120 may vibrate about an axis running through the slider 120 and in the y-direction as illustrated by arrows 140. This vibration causes a generally rocking motion of the leading edge 136 and trailing edge 134 of the slider 120.

Amplification of one or more vibration modes of the slider 120 may cause the slider 120 to tap the disc 108, rather than drag across the disc 108 when detecting contact with the disc 108. Tapping as compared to dragging reduces overall contact between the slider 120 and the disc 108. This reduces wear on and the possibility of damage to the slider 120 and/or the disc 108.

In one implementation, second pitch mode vibration about an axis running through the slider 120 and in the y-direction as illustrated by arrows 140 can cause periodic contact (i.e., tapping) of the slider 120 against the disc 108. As a result, the amplification (discussed in further detail below) may be directed at that vibration mode.

Figure 2:
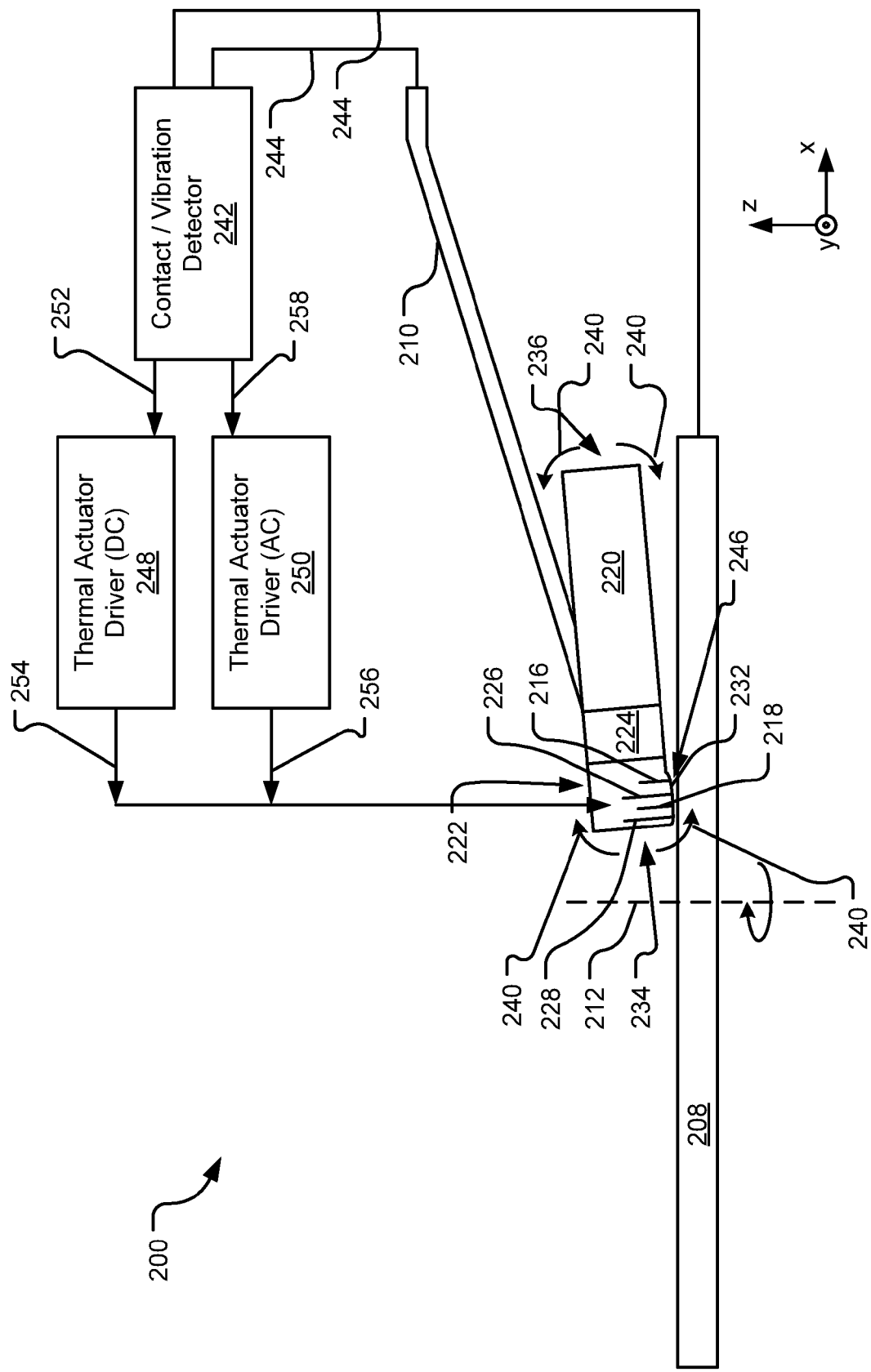
FIG. 2 illustrates an example schematic of a disc drive assembly with the capability of monitoring and affecting slider fly height.

FIG. 2 illustrates an example schematic of a disc drive assembly 200 with the capability of monitoring and affecting slider fly height. A disc 208 rotates at a high speed about disc axis of rotation 212 as information is written to and read from data tracks (not shown) on the disc 208. Information may be written to and read from the disc 208 through the use of the actuator arm 210. The actuator arm 210 extends toward the disc 208, and at a distal end of the actuator arm 210 is a slider 220, which flies in close proximity above the disc 208 while reading data from and writing data to the disc 208. In other implementations, there is more than one slider 220, actuator arm 210, and/or disc 208 in the disc drive assembly 200.

The slider 220 includes microelectronic components 222 mounted to a trailing edge 234 of the slider 220 with a basecoat 224 providing a physical interface between the microelectronic components 222 and the slider 220. The microelectronic components 222 include one or more of a reader 216, a fly height actuator 226, a writer 218, and a contact pad 228. Other microelectronic components may also be included in microelectronic components 222. The appearance of the microelectronic components 222 and other features of assembly 200 are for illustration purposes only and not drawn to scale.

The reader 216 reads data from the disc 208. The writer 218 writes data to the disc 208. The fly height actuator 226 varies the fly height of the reader 216 and writer 218 by expanding toward the disc 208 when power is applied to the fly height actuator 226. Expansion of the fly height actuator 226 causes a protrusion 232 of the slider 220 toward the disc 208 near the fly height actuator 226. The contact pad 228 is the portion of the slider 220 that extends closest to the disc 208 and is configured to contact the disc 208 when the fly height actuator 226 creates a large enough protrusion 232. The protrusion 232 of FIG. 2 is illustrated close to but not contacting the disc 208.

As discussed above, the slider 220 may vibrate during operation of the disc drive assembly 200. There may be several different modes of vibration of the slider 220. In the implementation of FIG. 2, the slider 220 experiences second mode vibration about an axis running through the slider 220 and in a y-direction as illustrated by arrows 240. This vibration causes a generally rocking motion of a leading edge 236 and the trailing edge 234 of the slider 220.

Amplification of the slider 220 vibration can cause the slider 220 to tap the disc 208, rather than drag across the disc 208 when detecting contact with the disc 208. Tapping as compared to dragging reduces overall contact between the slider 220 and the disc 208. This reduces wear on and the possibility of damage to the slider 220 and/or the disc 208.

A contact/vibration detector 242 is electrically connected to the slider 220 and the disc 208 via contacts 244. In one implementation, the contact/vibration detector 242 detects a decrease in amplitude of the vibration of the slider 220 caused by tapping contact with the disc 208. More specifically, when the slider 220 taps the disc 208, the amplitude of vibration is reduced because the presence of the disc limits vibratory travel of the slider 220. As a result, the contact/vibration detector 242 detects contact of the slider 220 and the disc 208.

In another implementation, the contact/vibration detector 242 includes an electrometer. The electrometer detects contact between the slider 220 body and the disc 208 by utilizing the slider 220 body as a first electrode and the disc 208 as a second electrode. In other implementations, the contact pad 228 on the slider 220 is used as the first electrode instead of the slider 220 body. The slider 220 and/or the disc 208 will carry some electric potential difference due to tribo-charging, for example. Since the slider 220 and the disc 208 are electrically isolated from one another by an air gap 246, so long as the air gap 246 exists between the slider 220 and the disc 208, the electrometer will register the electric potential difference and thus no contact. When the air gap 246 is reduced to zero by application of power to the fly height actuator 226 and expansion of the protrusion 232, the slider 220 and the disc 208 come in electrical contact and the electric potential difference is reduced to zero. As a result, the electrometer detects contact of the slider 220 and the disc 208.

Further, the electrometer may also be used to detect the vibratory frequencies of the slider 220. For example, a fast Fourier transform (FFT) may be performed on the incoming signal to the electrometer to find a resonant frequency of vibration of the slider 220. In one implementation, the FFT of the signal to the electrometer indicates a distinct peak around 200 kHz, which corresponds to the second pitch vibratory mode of the slider 208 (illustrated by arrows 240). In other implementations, the second pitch vibratory mode of the slider 208 may range from 180 kHz to 250 kHz. However, the exact mode of the vibration may vary according to the specific design of the disc drive assembly 200. For example, air bearing design of the disc-slider interface, rotational speed of the disc 208, position of the slider 220 relative to the disc 208, etc., may contribute to variation in the exact mode of the vibration.

Thermal actuator DC driver 248 and thermal actuator AC driver 250 are used to apply power to the fly height actuator 226 and affect fly height of the slider 220. In some implementations, the thermal actuator DC driver 248 and thermal actuator AC driver 250 are combined in one thermal actuator driver. In a calibration procedure, the thermal actuator DC driver 248 applies an increasing DC power signal (illustrated by arrow 254) to the slider 220 over time, reducing the fly height of the slider 220 over time, so long as the contact detector 242 does not detect contact between the slider 220 and the disc 208. When the contact detector 242 detects contact, the contact detector 242 signals the DC driver 248 (illustrated by arrow 252) to stop increasing output power and the present DC power magnitude applied to the fly height actuator 226 may be equated to contact or close proximity for disc drive assembly 200 calibration.

Further, the thermal actuator AC driver 250 simultaneously applies an AC signal (illustrated by arrow 256) superimposed on the increasing DC power applied by the thermal actuator DC driver 248. The combined result is an increasing sinusoidal power signal applied to the fly height actuator 226, so long as the contact detector 242 does not detect contact between the slider 220 and the disc 208. When the contact detector 242 detects contact, the contact detector 242 signals the AC driver 250 (illustrated by arrow 258) to reduce or eliminate the AC signal so that the vibration of the slider 220 is reduced or eliminated. In some implementations, when the contact detector 242 detects contact, the contact detector 242 signals the AC driver 250 (illustrated by arrow 258) to shift the AC signal out-of-phase with respect to the vibration of the slider 200 so that the vibration is more quickly reduced or eliminated.

In some implementations, the fly height actuator 226 does not respond quickly enough to oscillate with the frequency of the AC signal from the AC driver 250. In other words, the fly height actuator 226 has a relatively slow thermal time constant when compared to the frequency of the second mode vibration (see e.g., arrows 240) of the slider 220. As a result, the fly height actuator 226 merely responds to the DC power signal from the DC driver 248. However, electrostatic forces between the disc 208 and the slider 220 may respond more quickly than the fly height actuator 226. The AC signal from the AC driver 250 can cause amplification of the second mode vibration of the slider 220 by variation of the electrostatic forces at a resonant frequency of the second mode vibration.

In one implementation, the slider 220 and the disc 208 function as a first capacitor and the fly height actuator 226 and the slider 220 function as a second capacitor. In another implementation, the contact pad 228 and the disc 208 function as the first capacitor and the fly height actuator 226 and the contact pad 228 function as the second capacitor. As a result, a capacitive circuit exists between the fly height actuator 226 and the disc 208 through the first capacitor and the second capacitor. This capacitive circuit may be used to modulate the aforementioned electrostatic forces at a frequency of the AC signal from the AC driver 250. More specifically, an attractive force between the fly height actuator 226 and the disc 208 is modulated by varying potential between the fly height actuator 226 and the disc 208. In one implementation, the potential between the fly height actuator 226 and the disc 208 varies about 0.4 volts steady-state. In other implementations, the potential is significantly different than 0.4 volts steady-state and can be affected by material properties of the slider 220 and/or disc 208, for example.

A frequency of the AC signal from the AC driver 250 may match or nearly match the second mode vibration frequency of the slider 220. In one implementation, the frequency of the AC signal is within +/−3% of the second mode vibration frequency. Further, the phase of the AC signal from the AC driver 250 may match or nearly match the phase of the second mode vibration of the slider 220, as well. In one implementation, the phase of the AC signal is within +/−3% of the phase of the second mode vibration of the slider 220. When both the phase and frequency of the AC signal matches or nearly matches the phase and frequency of the second mode vibration, the amplitude of the slider 220 should increase. This increased amplitude creates tapping contact as compared to dragging contact between the slider 220 and the disc 208 when the slider 220 is in close proximity to the disc 208.

Figure 3A:
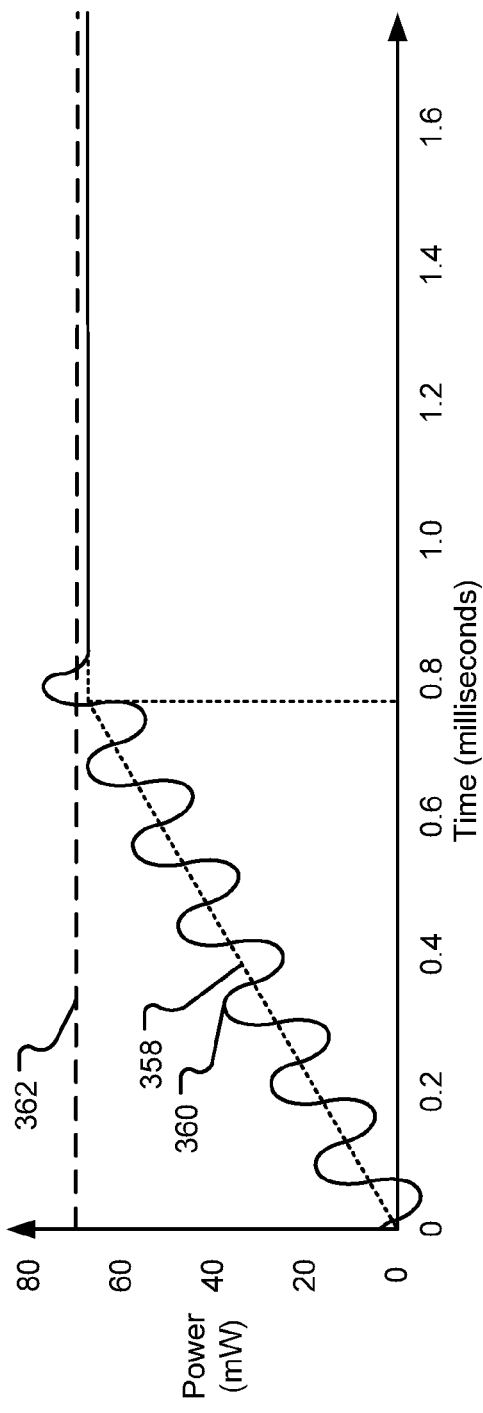
FIG. 3A illustrates an example actuator power timeline as a slider is calibrated in close proximity to a corresponding storage disc.

FIG. 3A illustrates an example actuator power timeline as a slider is calibrated in close proximity to a corresponding storage disc. A DC component power signal (illustrated by dotted line 358) combined with a sinusoidal AC component power signal creates combined power signal 360. From 0 seconds to approximately 0.8 milliseconds, the DC component increases linearly and the AC component oscillates sinusoidally about the DC component with a constant amplitude and frequency. The frequency and phase of the AC component matches or nearly matches a vibration mode (or resonant frequency and phase of the vibration mode) of the slider in order to create tapping contact between the slider and the storage disc, as described above. The increasing DC component brings the slider closer to the storage disc over time (as illustrated in FIG. 3B).

Contact is detected at approximately 70 mW of power to the fly height actuator (illustrated by dotted line 362). The contact may be detected by an electrometer or other devices as described in detail above. The combined power signal 360 exceeds 70 mW at approximately 0.8 milliseconds. At that point, the DC component power signal 358 is changed to a steady state power magnitude and the AC component is reduced to zero. This power setting allows the slider to be in close proximity to the storage disc and the vibration frequency of the slider decreases back to its natural amplitude.

In an alternative implementation, the AC component is not reduced to zero at 0.8 milliseconds and is instead shifted out-of-phase with the same or a different amplitude. This phase shift more quickly reduces the vibration frequency of the slider to its natural amplitude when compared to reducing the AC component to zero. Further, the AC component phase shift may actively dampen the vibration of the slider below its natural amplitude. This active dampening can allow for smaller fly heights of the slider, greater storage density on the disc, and/or less potential for slider-disc contact.

Figure 3B:
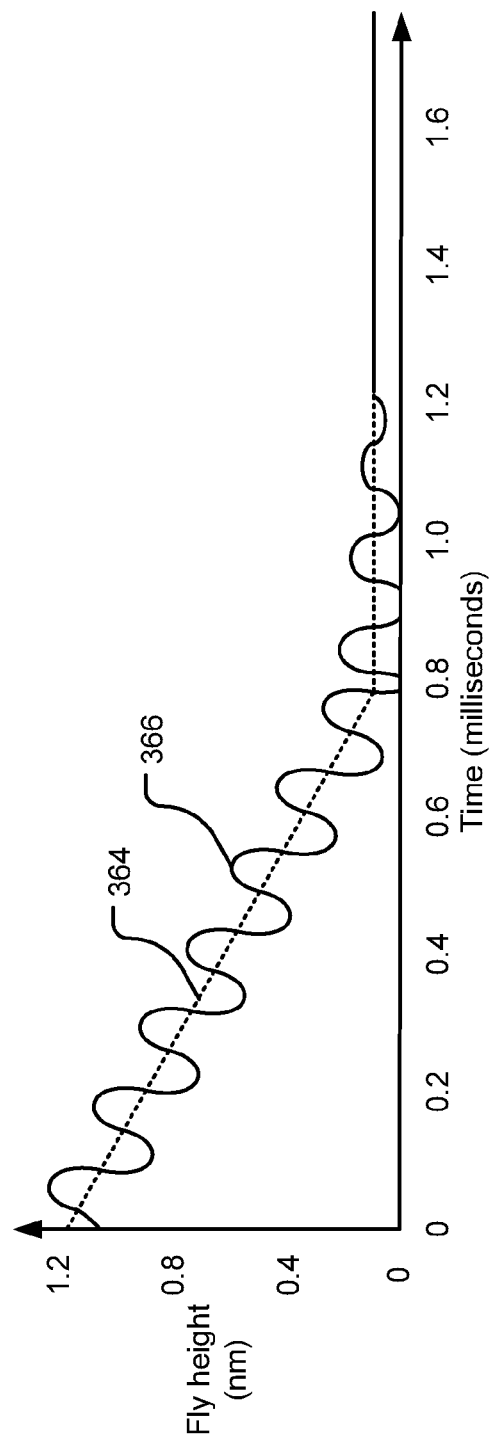
FIG. 3B illustrates an example fly height timeline as a slider is calibrated in close proximity to a corresponding storage disc.

FIG. 3B illustrates an example fly height timeline as a slider is calibrated in close proximity to a corresponding storage disc. Overall fly height (illustrated by dotted line 364) of the slider decreases as the DC component power is increased as illustrated in FIG. 3A. As overall fly height is decreased, the slider is brought closer to the storage disc. Further, the fly height oscillates sinusoidally with a vibration frequency matching or nearly matching the AC component power vibration frequency (or a resonant frequency and phase of the AC component power vibration frequency) as illustrated in FIG. 3A. A combination of the overall fly height and the sinusoidal vibration creates combined fly height metric 366.

The slider first taps the storage disc at approximately 0.8 milliseconds (illustrated by the combined fly height metric 366 reaching 0 nm fly height). The contact may be detected by an electrometer or other devices as described in detail above. At that point, the DC component power signal is changed to a steady state power magnitude and the AC component is reduced to zero or made out of phase as discussed above with respect to FIG. 3A. Since there is a delay (e.g., 10-100 microseconds) between the change in AC and DC power signals and a response from a corresponding fly height actuator and the slider, the slider will continue to oscillate at a decreasing amplitude over time. As a result, the slider taps the storage disc two additional times at approximately 0.9 milliseconds and 1.0 milliseconds before the vibration amplitude has decreased sufficiently to prevent further contact between the slider and the storage disc. In other implementations, the slider will tap the storage disc greater or fewer than three times before the vibration amplitude is sufficiently reduced to prevent the tapping. In one implementation, the slider taps the storage disc approximately 10 times.

Further, the amplitude of the slider vibrations will decrease until the slider reaches its natural vibration amplitude or a lower amplitude if an out-of-phase AC signal dampens the vibration. In FIG. 3B, most if not all vibration of the slider is removed by 1.2 seconds. The power, time, and fly height metrics discussed with regard to FIG. 3 are examples only. Other power, time, and fly height metrics are contemplated herein.

Figure 4:
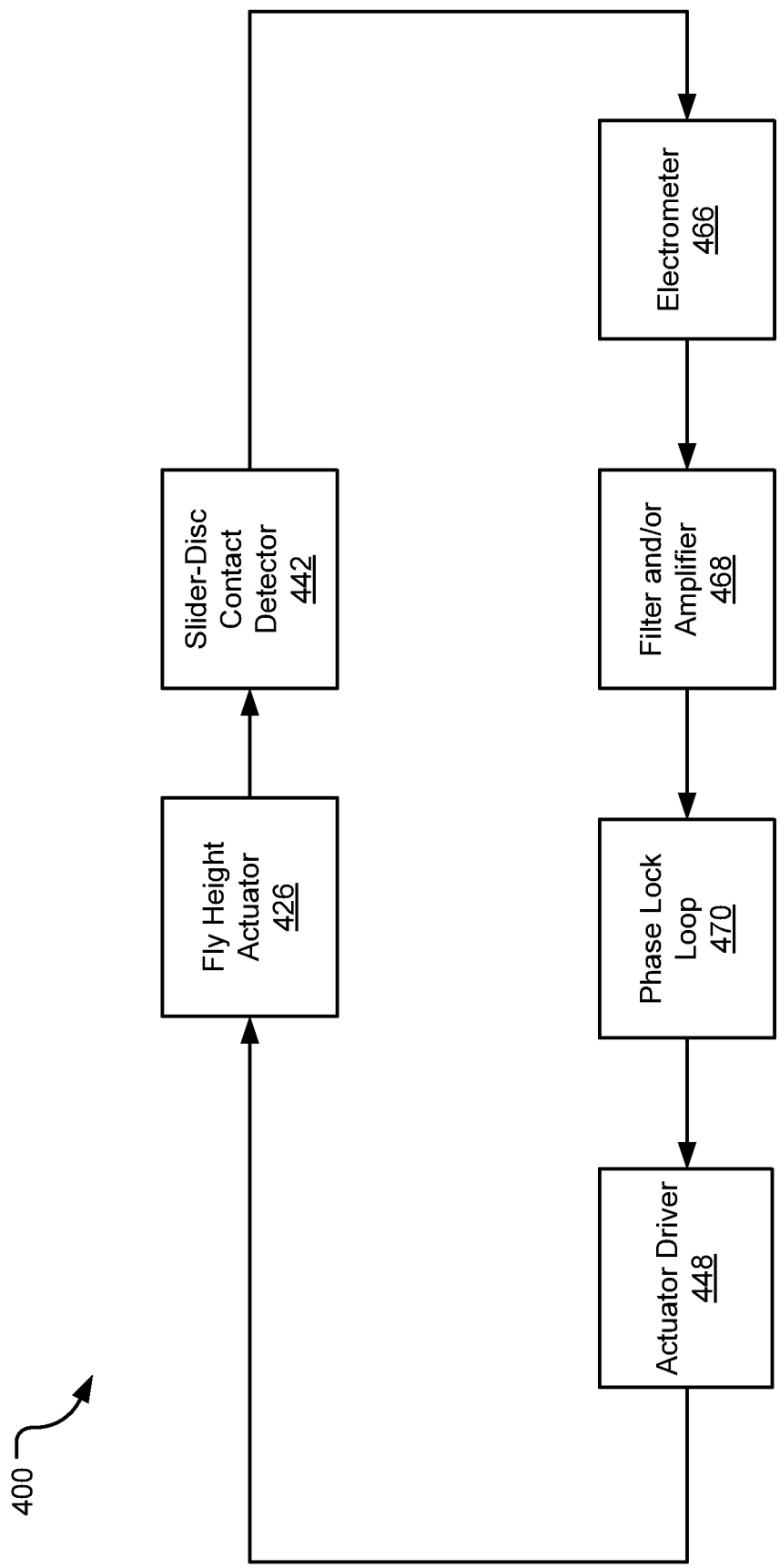
FIG. 4 illustrates an example driving circuit for a fly height actuator configured to calibrate a slider in close proximity to a corresponding storage disc.

FIG. 4 illustrates an example driving circuit 400 for a fly height actuator 426 configured to calibrate a slider in close proximity to a corresponding storage disc. The second pitch mode vibration or other vibration of the slider may not have a fixed vibratory frequency. As a result, the driving circuit 400 provides active monitoring of the slider vibratory frequency using an electrometer 466 and feedback control of the fly height actuator 426 based on the detected vibratory frequency.

The fly height actuator 426 varies the fly height of the slider by expanding toward the storage disc when power is applied to the fly height actuator 426. Expansion of the fly height actuator 426 causes a protrusion of the slider toward the storage disc near the fly height actuator 426. In one implementation, the fly height actuator 426 is thermally actuated. A slider-disc contact detector 442 detects a decrease in amplitude of the vibration of the slider caused by tapping contact with the storage disc. More specifically, when the slider taps the storage disc, the amplitude of vibration is reduced because the presence of the storage disc limits vibratory travel of the slider. As a result, the contact detector 442 detects contact of the slider and the storage disc.

The electrometer 466 (or current-to-voltage converter) detects the vibratory frequencies of the slider by decomposing the oscillating output current signal from the contact detector 442 into voltage components with different frequencies. For example, a fast Fourier transform (FFT) may be performed on the oscillating output current signal from the contact detector 442 to find a resonant frequency of vibration of the slider (e.g., the second pitch vibratory mode of the slider). In one implementation, the electrometer 466 includes a variable gain amplifier, full wave peak detector, and a low pass filter. The variable gain amplifier is adjusted so that the input to the fly height actuator 426 equals 1-volt peak-to-peak. The full wave peak detector detects the vibratory frequencies of the slider. The low pass filter filters out high-frequency noise output from the full wave peak detector.

The output from the electrometer 466 may be very low amplitude and contain multiple resonant frequencies and/or noise. For example, a virtual grounding of the slider, power supply fluctuations, other unwanted slider modes of vibration, suspension resonant frequencies, etc., may cause the unwanted resonant frequencies and/or noise. A filter and/or amplifier 468 amplifies the output from the electrometer 466 and/or filters out unwanted resonant frequencies. More specifically, the amplifier may be an automatic gain amplifier to boost the output from the electrometer 466 to a magnitude sufficient to control a DC actuator driver 448 and an AC actuator driver 450 (discussed in more detail below). Further, the filter may be a band-pass filter (e.g., a multiple feedback band-pass filter) that enables independent adjustment of the filter's quality factor, mid-band gain, and/or mid-band frequency in order to filter out the unwanted resonant frequencies.

A phase lock loop 470 adjusts phase of its input signal so that load current and load voltage are in phase with one another. More specifically, the phase lock loop 470 adjusts the driving frequency to match the second mode vibration of the slider. As a result, the phase lock loop 470 provides closed loop control of the driving mode of the fly height actuator 426 based on the detected second mode vibration frequency. In one implementation, the phase lock loop 470 includes a phase detector, a filter, a voltage control oscillator, and a programmable controller. The phase detector generates a voltage signal, which represents the difference in phase between the voltage output from the filter and/or amplifier 468 and a load current output from the programmable controller. The low-pass filter filters out high-frequency noise. The voltage control oscillator outputs an oscillating load current using the filtered load voltage. The programmable controller feeds the load current back into the phase detector.

The output of phase lock loop 470 is fed into actuator driver 448. In some implementations, the actuator driver 448 is separated into an actuator DC driver and an actuator AC driver 250. The actuator driver 448 is used to apply power to the fly height actuator 426 and affect fly height of the slider. In a calibration procedure, the actuator driver 448 applies an increasing DC power signal to the slider over time, reducing the fly height of the slider over time, so long as the contact detector 442 does not detect contact between the slider and the disc. When the contact detector 442 detects contact, the actuator driver 448 stops increasing output power and the present DC power magnitude applied to the fly height actuator 426 may be equated to contact or close proximity for disc drive assembly calibration.

Further, the actuator driver 448 simultaneously applies an AC signal superimposed on the increasing DC power signal. The combined result is an increasing sinusoidal power signal applied to the fly height actuator 426, so long as the contact detector 442 does not detect contact between the slider and the disc. When the contact detector 442 detects contact, the actuator driver 448 reduces or eliminates the AC signal so that the vibration of the slider is reduced or eliminated. In some implementations, when the contact detector 242 detects contact, the actuator driver 448 shifts the AC signal out-of-phase with respect to the slider vibration so that the slider vibration is more quickly reduced or eliminated.

Figure 5:
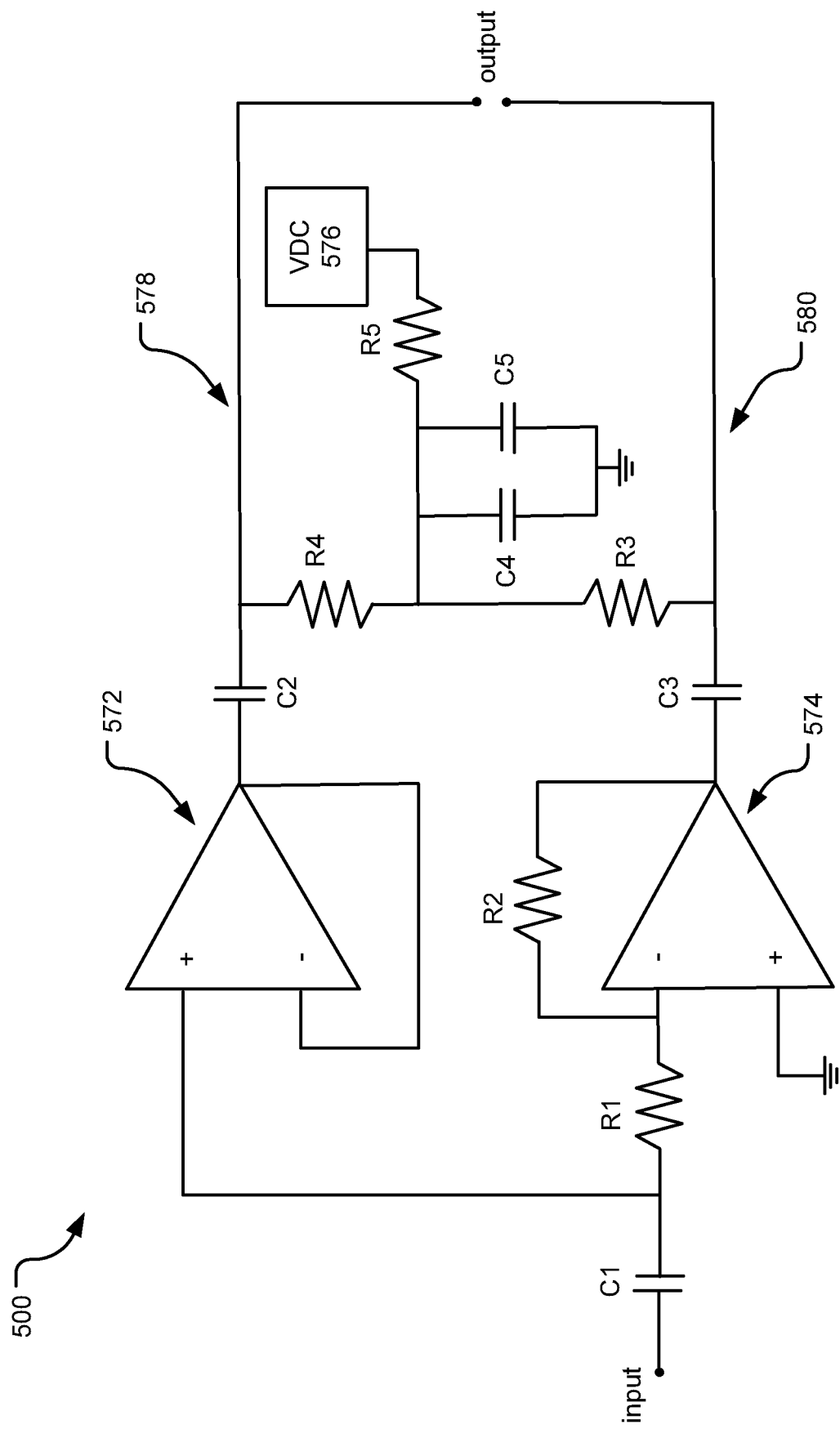
FIG. 5 illustrates an example schematic circuit of an actuator driver configured to calibrate a slider in close proximity to a corresponding storage disc.

FIG. 5 illustrates an example schematic circuit of an actuator driver 500 configured to calibrate a slider in close proximity to a corresponding storage disc. A signal from a phase lock loop (see e.g., phase lock loop 470 of FIG. 4) in a driving circuit (see e.g., driving circuit 400 of FIG. 4) is input into the thermal actuator driver 500. A capacitor C1 blocks any DC component of the signal while allowing the AC component, which corresponds to a vibration frequency of the slider to pass. The actuator driver 500 then splits the AC signal into two branches 578, 580. A first branch 578 includes a non-inverting amplifier 572 and the second branch 580 an inverting amplifier 574, each with a gain of 1. Further, each branch includes a capacitor (C2 and C3) to block any DC component added by the amplifiers 572, 574, while allowing the normalized and inverted AC components to pass, respectively. The capacitors C1, C2, and C3 may have a value of 100 nF, for example. In one implementation, the normalized and inverted AC components are approximately 180 degrees out of phase with one another.

The actuator driver 500 further includes a DC voltage source, which is selectively applied to the normalized AC component or the inverted AC component, depending on the state of a switch (not shown). More specifically, any residual AC components of the output of the DC voltage source are grounded via capacitors C4 and C5. The capacitor C4 may have a value of 100 nF, for example. The capacitor C5 may have a value of 47 μF, for example. The remaining DC power signal is selectively applied to the first branch 578 or second branch 560 depending on the resistance values of variable resistors R3 and R4. The resistors R3 and R4 may have values ranging from 0 to 30 kohms, for example.

For example, if the switch is in a first position, R3 is given a relatively large resistance value and R4 is given a relatively small or non-existent resistance value. As a result, the DC power signal travels into the first branch 578 and is combined with the normalized AC component as it is output to a fly height actuator. This position of the switch may be used to apply an in-phase signal to the slider so that its vibrations are magnified for contact detection by tapping the disc as opposed to sliding across the disc, as discussed in detail above.

If the switch is in a second position, R3 is given a relatively small or non-existent resistance value and R4 is given a relatively large value. As a result, the DC power signal travels into the second branch 580 and is combined with the inverted AC component as it is output to the fly height actuator. This position of the switch may be used to apply an out-of-phase signal to the slider so that its vibrations are actively dampened after contact detection, as discussed in detail above.

Other resistors (e.g., R1, R2, and R5) provide a variety of signal conditioning functions. The resistors R1, R2, and R5 may have values of 10 kohms, 10 kohms, and 6 ohms, respectively, for example. Other arrangements of components comprising the actuator driver 500 are contemplated herein.

FIG. 6 illustrates example operations 600 for adjusting fly height of a transducer slider using tapping contact with a storage disc. A detecting operation 610 detects a frequency of a vibration mode of a transducer slider. In one implementation, detecting operation 610 is accomplished by detecting an electric potential difference between the transducer slider and the storage disc using an electrometer. Further the vibration mode may be a second pitch mode of the transducer slider.

A first generating operation 620 generates an AC signal oscillating at a resonant frequency of the detected vibration mode of the transducer slider. A second generating operation 630 generates a DC signal that decreases fly height of the transducer slider. In one implementation, the AC signal and the DC signal are combined together into a AC-DC signal and applied to a fly height actuator that mechanically varies the fly height. Further, the fly height actuator may be thermally actuated. Operations 610 and 620 may be iteratively repeated to ensure that the generated AC signal tracks any changes in the frequency of the vibration mode of the transducer slider.

A decision operation 640 determines if there is tapping contact between the transducer slider and a storage disc. In one implementation, the decision operation 640 is performed by a slider-disc contact detector. More specifically, the decision operation 640 may operate by detecting a transition between an increasing vibration amplitude to a constant vibration amplitude. In other implementations, the decision operation 640 may operate by detecting a transition between a constant vibration amplitude to a decreasing vibration amplitude.

If the decision operation 640 determines that there is no tapping contact between the transducer slider and the storage disc, increasing operation 650 increases the magnitude of the DC signal. An increased magnitude of the DC signal decreases the fly height of the transducer slider. Operations 640 and 650 are iteratively repeated until decision operation 640 determines that there is tapping contact between the transducer slider and the storage disc.

When the decision operation 640 determines that there is tapping contact between the transducer slider and the storage disc, eliminating operation 660 and/or shifting operation 670 are performed. The eliminating operation 660 eliminates the AC signal from the combined AC-DC signal. As a result, the vibration mode of a transducer slider returns to its unamplified magnitude. The shifting operation 670 shifts the AC signal out-of-phase with respect to the detected vibration mode of the transducer slider. This actively dampens the vibration mode of the transducer slider. As a result, the magnitude of the amplified vibration mode of the transducer slider is reduced more quickly than in eliminating operation 660 and may be reduced below the unamplified magnitude. Operations 660 and 670 may be used independently or in a sequence.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A system comprising:
   an actuator driver configured to create a protrusion on a transducer slider and amplify a vibration mode of the transducer slider to cause the protrusion to tap against a storage media.

2. The system of claim 1, wherein the vibration of the transducer slider is about an axis running through the transducer slider.

3. The system of claim 2, wherein the actuator driver is further configured to induce oscillation of the transducer slider about the axis at a resonant frequency of the vibration mode.

4. The system of claim 1, wherein the actuator driver is further configured to generate an AC signal in-phase with respect to the vibration mode of the transducer slider to amplify the vibration mode of the transducer slider.

5. The system of claim 4, further comprising:
a phase lock loop configured to actively adjust the AC signal frequency and phase to equal the resonant frequency and phase of the vibration mode of the transducer slider.

6. The system of claim 1, wherein the actuator driver is further configured to generate an AC signal out-of-phase with respect to the vibration mode of the transducer slider to dampen the vibration mode of the transducer slider.

7. The system of claim 1, wherein the actuator driver is further configured to generate a DC signal increasing in magnitude over time that decreases fly height of the transducer slider.

8. The system of claim 1, further comprising:
a contact detector configured to detect tapping contact between the protrusion and a storage disc.

9. The system of claim 1, further comprising:
an electrometer configured to detect the frequency of the vibration mode of the transducer slider.

10. The system of claim 1, further comprising:
a fly height actuator configured to move the transducer slider toward a storage disc until the protrusion is in tapping contact with the storage disc.

11. The system of claim 1, wherein the vibration mode of the transducer slider is a second pitch mode with a frequency ranging from 180 kHz to 250 Khz.

12. The system of claim 1, wherein the actuator driver further comprises:
an AC actuator driver configured to amplify the vibration mode of the transducer slider; and
a DC actuator driver configured to create the protrusion on the transducer slider.

13. A method comprising:
generating a signal to create a protrusion on a transducer slider;
detecting a frequency of a vibration mode of the transducer slider;
amplifying the vibration mode of the transducer slider to cause tapping contact between the protrusion and a storage disc; and
detecting the tapping contact between the protrusion and the storage disc.

14. The method of claim 13, wherein the amplifying operation includes generating an AC signal oscillating at a resonant frequency of the detected vibration mode.

15. The method of claim 14, further comprising:
eliminating the AC signal, responsive to the detecting tapping contact operation.

16. The method of claim 14, further comprising:
shifting the AC signal out-of-phase with respect to the resonant frequency of the transducer slider to dampen the detected vibration mode of the transducer slider, responsive to the detecting tapping contact operation.

17. The method of claim 14, further comprising:
adjusting the AC signal frequency and phase to equal the resonant frequency and phase of the vibration mode of the transducer slider.

18. The method of claim 13, wherein the generating operation generates a DC signal to a fly height actuator and the DC signal increases in magnitude and decreases fly height of the transducer slider over time, prior to the detecting tapping contact operation.

19. The method of claim 13, wherein the generating operation generates a DC signal to a fly height actuator and the DC signal is constant in magnitude over time and maintains a constant fly height of the transducer slider, responsive to the detecting tapping contact operation.

20. The method of claim 13, wherein the detecting the frequency of the vibration mode operation and the amplifying the vibration mode operation are performed iteratively.

21. An actuator driver circuit comprising:
a first branch with a non-inverting amplifier configured to output an AC signal oscillating at a resonant frequency of a transducer slider and amplify a detected vibration mode of the transducer slider;
a second branch with an inverting amplifier configured to output an AC signal out-of-phase with respect to the resonant frequency of the transducer slider and dampen the detected vibration mode of the transducer slider; and
a switch configured to select the first branch prior to detecting tapping contact between the transducer slider and a storage disc and select the second branch after detecting the tapping contact.

* * * * *